(12) United States Patent
Vedantham et al.

(10) Patent No.: US 12,015,553 B2
(45) Date of Patent: *Jun. 18, 2024

(54) DYNAMIC MEDIUM SWITCHING FOR HYBRID NETWORKS

(71) Applicant: TEXAS INSTRUMENTS INCORPORATED, Dallas, TX (US)

(72) Inventors: Ramanuja Vedantham, Allen, TX (US); Jiun-Ren Lin, Pittsburgh, PA (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,812

(22) Filed: Nov. 9, 2021

(65) Prior Publication Data

US 2022/0070093 A1 Mar. 3, 2022

Related U.S. Application Data

(63) Continuation of application No. 16/148,175, filed on Oct. 1, 2018, now Pat. No. 11,201,821, which is a
(Continued)

(51) Int. Cl.
*H04L 12/00* (2006.01)
*H04L 45/00* (2022.01)
(Continued)

(52) U.S. Cl.
CPC ............ *H04L 45/70* (2013.01); *H04L 45/124* (2013.01); *H04W 40/12* (2013.01); *Y02D 30/70* (2020.08)

(58) Field of Classification Search
None
See application file for complete search history.

(56) References Cited

U.S. PATENT DOCUMENTS

| 9,001,787 B1 | 4/2015 | Conant et al. |
| 10,091,101 B2 | 10/2018 | Vedantham et al. |

(Continued)

FOREIGN PATENT DOCUMENTS

| JP | 2004312725 A | * | 11/2004 | ......... H04L 12/2602 |
| WO | WO-2008095127 A2 | * | 8/2008 | ............ H04W 84/00 |

OTHER PUBLICATIONS

JP-2004312725-A translation (Year: 2004).*

*Primary Examiner* — Noel R Beharry
*Assistant Examiner* — Lionel Preval
(74) *Attorney, Agent, or Firm* — Michael T. Gabrik; Frank D. Cimino

(57) ABSTRACT

A method and apparatus for dynamic medium switching in a hybrid network. A method for packet transmission by a combo device includes maintaining a wireless network confidence rating value that is indicative of packet transfer reliability of a wireless network accessed by the device. A wired network confidence rating value that is indicative of packet transfer reliability of a wired network accessed by the device is also maintained. One of the wireless network and the wired network to be used for initial transmission of the data packet is selected based on which of the wireless confidence rating value and the wired confidence rating value is indicative of a higher likelihood of the packet being successfully transmitted. The packet is routed to be transmitted via the selected network.

20 Claims, 5 Drawing Sheets

Related U.S. Application Data continuation of application No. 14/519,990, filed on Oct. 21, 2014, now Pat. No. 10,091,101.

(60) Provisional application No. 61/893,432, filed on Oct. 21, 2013.

(51) Int. Cl.
*H04L 45/12* (2022.01)
*H04W 40/12* (2009.01)

(56) References Cited

U.S. PATENT DOCUMENTS

| | | |
|---|---|---|
| 2002/0080774 A1 | 6/2002 | Griffith et al. |
| 2006/0075124 A1 | 4/2006 | Dougherty et al. |
| 2006/0221998 A1* | 10/2006 | Livet .................. H04L 12/5692 370/464 |
| 2007/0140129 A1* | 6/2007 | Bauer .................. H04L 45/124 370/238 |
| 2008/0279101 A1* | 11/2008 | Wu ...................... H04L 45/124 370/235 |
| 2009/0201899 A1 | 8/2009 | Liu |
| 2009/0238075 A1 | 9/2009 | Mosko |
| 2010/0202358 A1* | 8/2010 | Wu ........................ H04L 47/41 370/328 |
| 2013/0028104 A1 | 1/2013 | Hui et al. |
| 2013/0223229 A1 | 8/2013 | Hui et al. |
| 2014/0036702 A1 | 2/2014 | Van Wyk et al. |
| 2014/0122956 A1* | 5/2014 | Yun ...................... H04L 1/1829 714/748 |
| 2015/0023348 A1 | 1/2015 | Hui et al. |
| 2015/0038156 A1 | 2/2015 | Kilpatrick, II et al. |

* cited by examiner

DYNAMIC MEDIUM SWITCHING FOR HYBRID NETWORKS

CROSS-REFERENCE TO RELATED APPLICATIONS

The present application is a continuation of U.S. patent application Ser. No. 16/148,175 filed Oct. 1, 2018, which is a continuation of U.S. patent application Ser. No. 14/519,990 filed on Oct. 21, 2014, now U.S. Pat. No. 10,091,101, which claims priority to U.S. Provisional Patent Application No. 61/893,432, filed on Oct. 21, 2013, entitled "Dynamic Medium Switching Algorithm for Hybrid Smart Grid Networks," all of which are hereby incorporated herein by reference in their entireties.

BACKGROUND

The "smart grid" generally refers to electricity delivery systems that use computer-based remote control to manage power delivery. The systems include two-way communication technology and processing that facilitate energy delivery and use measurement. Each device connected to the smart grid may include sensors to collect energy use and network status information; and network transceiver electronics to provide communication between devices.

SUMMARY

A method and apparatus for dynamic medium switching in a hybrid network are disclosed herein. In one embodiment, a wireless device includes a wireless transceiver, a wired transceiver, and medium switching logic. The wireless transceiver is configured for transfer of data packets via a wireless network. The wired transceiver is configured for transfer of data packets via a wired network. The medium switching logic determines which of the wireless transceiver and the wired transceiver is to be used to transmit a data packet. The medium switching logic is configured to maintain a wireless network confidence rating value that is indicative of packet transfer reliability of the wireless network, and to maintain a wired network confidence rating value that is indicative of packet transfer reliability of the wired network. The medium switching logic is also configured to select one of the wireless transceiver and the wired transceiver to be used for initial transmission of the data packet based on which of the wireless confidence rating value and the wired confidence rating value is indicative of a higher likelihood of the packet being successfully transmitted, and to route the packet to the selected transceiver for transmission.

In another embodiment, a method for packet transmission by a combo device includes maintaining a wireless network confidence rating value that is indicative of packet transfer reliability of a wireless network accessed by the device. A wired network confidence rating value that is indicative of packet transfer reliability of a wired network accessed by the device is also maintained. One of the wireless network and the wired network to be used for initial transmission of the data packet is selected based on which of the wireless confidence rating value and the wired confidence rating value is indicative of a higher likelihood of the packet being successfully transmitted. The packet is routed to a transceiver of the combo node for transmission via the selected network.

In a further embodiment, a smart grid network includes a plurality of nodes communicatively coupled via a wired network or a wireless network. At least one of the nodes includes medium switching logic that determines which of the wireless network and the wired network is to be used to transmit a data packet. The medium switching logic is configured to maintain a wireless network confidence rating value that is indicative of packet transfer reliability of the wireless network, and to maintain a wired network confidence rating value that is indicative of packet transfer reliability of the wired network. The medium switching logic is also configured to select one of the wireless network and the wired network to be used for initial transmission of the data packet based on which of the wireless confidence rating value and the wired confidence rating value is indicative of a higher likelihood of the packet being successfully transmitted. The medium switching logic is further configured to select a retransmission allowance that defines a number of allowable transmission attempts for the initial transmission. The retransmission allowance is determined based on a difference of the wired network confidence rating and the wireless network confidence rating. The medium switching logic is also configured to provide the data packet and retransmission allowance to transmission logic for packet transmission via the selected network.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In a conventional smart grid network, devices communicate using either Radio Frequency (RF) or Power Line Communication (PLC). In order to provide better system reliability, better coverage, and larger network throughput, some smart grid networks may include combo nodes that support both RF and PLC links. The combo nodes can dynamically select the optimal link over which to forward a data packet. The method for determining the optimal link over which to transmit a packet is referred to herein as a Dynamic Medium Switching Algorithm (DMSA).

Embodiments of the present disclosure include DMSA logic that provides improved system performance in hybrid smart grid networks. Devices implementing the DMSA dynamically determine, based on channel condition and other variables, what medium to employ to transfer a data packet.

Figure 1:
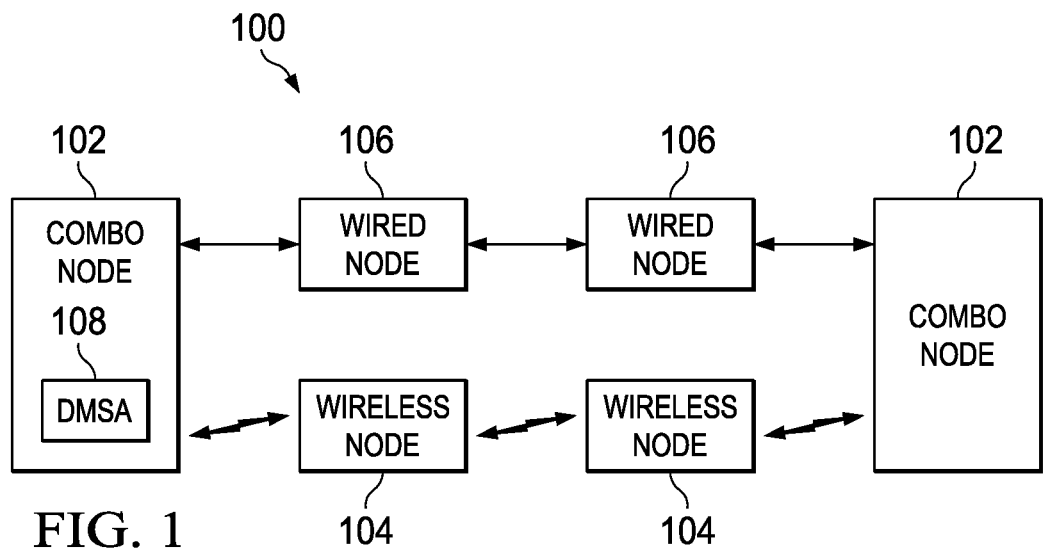
FIG. 1 shows a block diagram of a hybrid network in accordance with various embodiments.

FIG. 1 shows a block diagram of a hybrid network 100 in accordance with various embodiments. The network 100 includes wired nodes 106, wireless nodes 104 and combo nodes 102. The nodes 102, 104, and 106 are communication devices. The wired nodes 106 communicate via an electrically conductive medium, such as wiring. The wireless nodes 104 communicate wirelessly via radio frequency electromagnetic signals. The combo nodes 102 can selectively communicate via the conductive medium or the wireless medium. In some embodiments of the network 100, the wired nodes 106 and combo nodes 102 may form a wired network that communicates via the conductors of an electrical power distribution system using protocols specified by a standard such as IEEE 1901.2, the G3-PLC standard, or other power line communication standard. The wireless nodes 104 and the combo nodes 102 may form a wireless network that communicates using protocols specified by a standard such as IEEE 802.15.4, IEEE 802.11, or other wireless communication standard.

The combo nodes 102 include DMSA system 108. The DMSA system 108 maintains confidence rating values for packet transfers via the wired and wireless networks, and selects, for each packet to be transmitted by the combo node 102, the network most likely to provide successful transfer of the packet to a destination device. The confidence ratings are based on historical performance of the wired and wireless networks measured by each combo node 102. By selecting the network most likely to produce successful data transfer for each packet, the combo node 102 increases the probability of successful data transfer while reducing the number of retransmissions needed to provide successful transfer.

Figure 2:
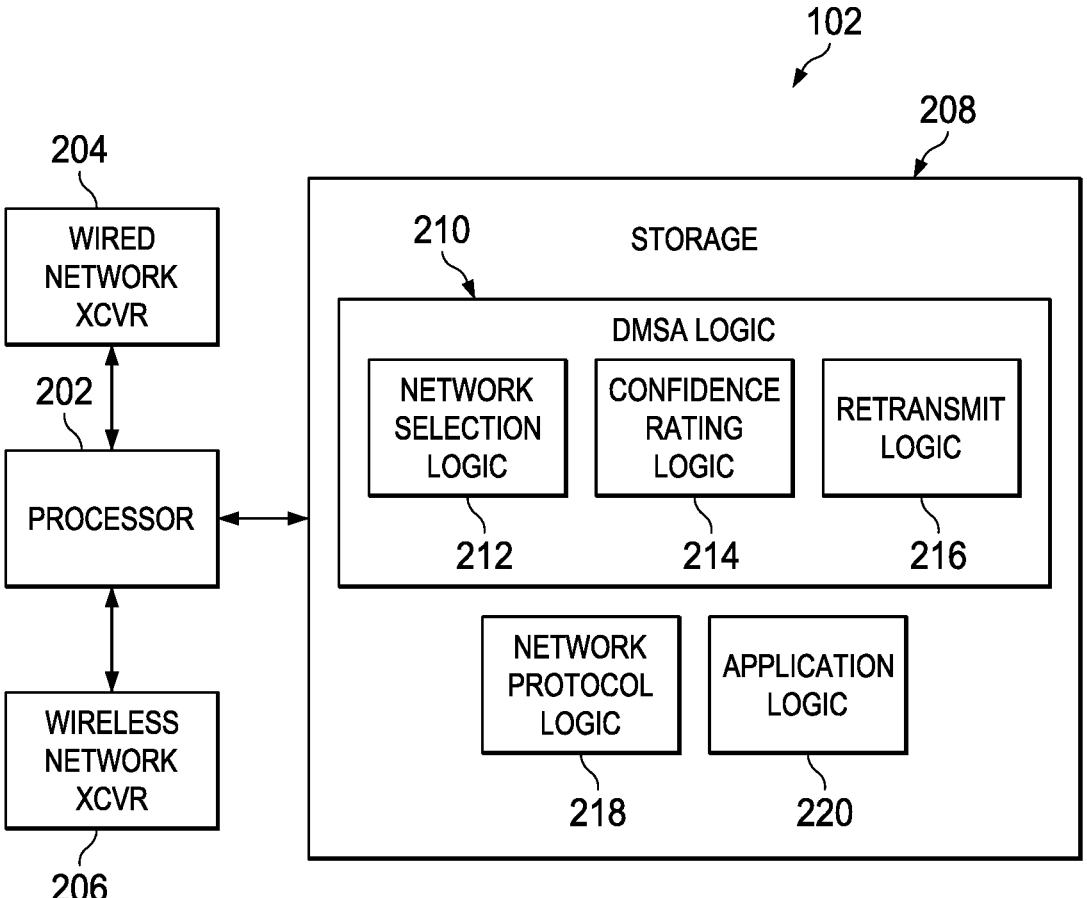
FIG. 2 shows a block diagram of a combo node in accordance with various embodiments.

FIG. 2 shows a block diagram of a combo node 102 in accordance with various embodiments. The combo node 102 includes a processor 202, a wired network transceiver 204, a wireless network transceiver 206, and storage 208. The combo node 102 may include various other components and subsystems that have been omitted from FIG. 2 in the interest of clarity. For example, the combo node 102 may include power systems that provide electrical power to the circuitry of the combo node 102, sensors that allow the combo node 102 to measure parameters of operation, and/or other components or sub-systems.

The wired network transceiver 204 couples the combo node 102 to the wired network, and provides modulation, encoding, signal drive, and other functionality needed to access and transfer data via the wired network. Similarly, the wireless network transceiver 206 couples the combo node 102 to the wireless network, and provides modulation, encoding, signal drive, and other functionality needed to access and transfer data via the wireless network.

The processor 202 is coupled to the wired transceiver 204 and the wireless transceiver 206, and may be a general-purpose microprocessor, a digital signal processor, a microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, instruction and data fetching logic, peripherals (e.g., interrupt controllers, timers, direct memory access controllers, etc.), input/output systems (e.g., serial ports, parallel ports, etc.) and various other components and sub-systems.

The storage 208 is a non-transitory computer-readable storage medium suitable for storing instructions executable by the processor 202. The storage 208 may include volatile storage such as static and/or dynamic random access memory, or other volatile memory. The storage 208 may also include non-volatile storage, such FLASH storage, read-only-memory, or other non-volatile storage. The storage 208 includes application logic 202, network protocol logic 218, and DMSA logic 210. The DMSA system 108 shown in FIG. 1 comprises the processor 202 and the DMSA logic 210.

Application logic 220 includes instructions of various applications executed by the combo node 102. For example, an application may periodically read a sensor coupled to the processor 202 and transfer a measurement value to a destination device via the hybrid network 100. The network protocol logic 218 includes instructions that implement at least a portion of a protocol stack applied to packets transmitted or received on each of the wired and wireless networks. The wired network may apply a different protocol stack than the wireless network. For example, the wired network may implement a protocol in accordance with the IEEE 1901.2 standard, and the wireless network may implement a protocol in accordance with the IEEE 802.15.4 standard.

Figure 3:
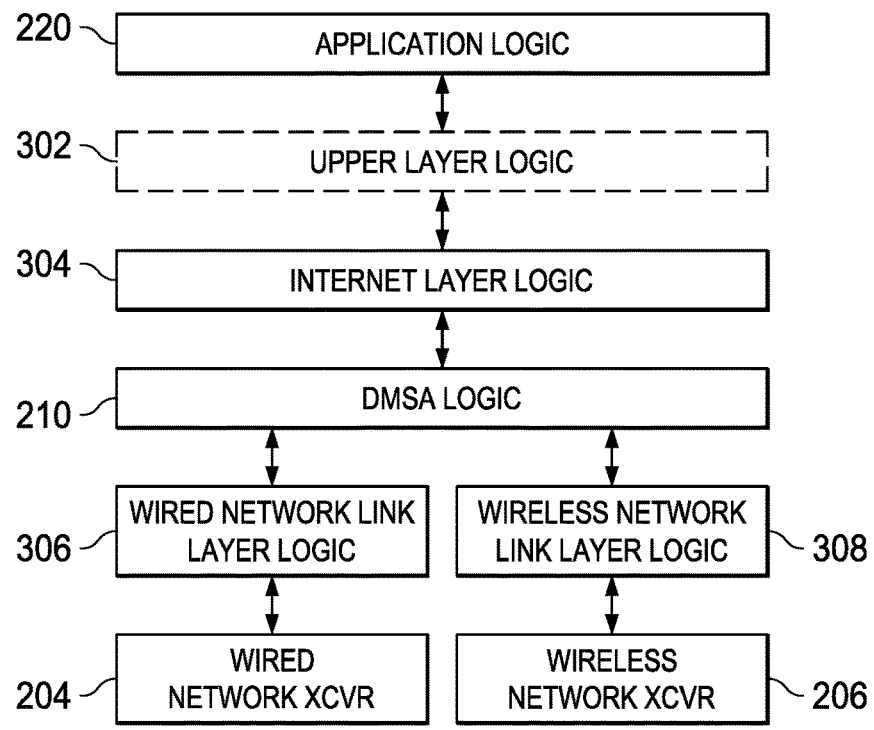
FIG. 3 shows arrangement of logic in a combo node in accordance with various embodiments.

The DMSA logic 210 includes instructions executed by the processor 202 to implement network selection for each packet transmitted by the combo node 102. FIG. 3 shows arrangement of logic in the combo node 102 in accordance with various embodiments. The protocol logic layers 302, 304, 306, and 308 may be provided by the network protocol logic 218. The DMSA logic 210 operates and transfers data between the internet layer logic 304 (e.g., IP layer logic) common to both wired and wireless networks and the link layer logic 306, 308 (e.g., medium access control logic) specific to each of the wired and wireless networks.

Figure 4:
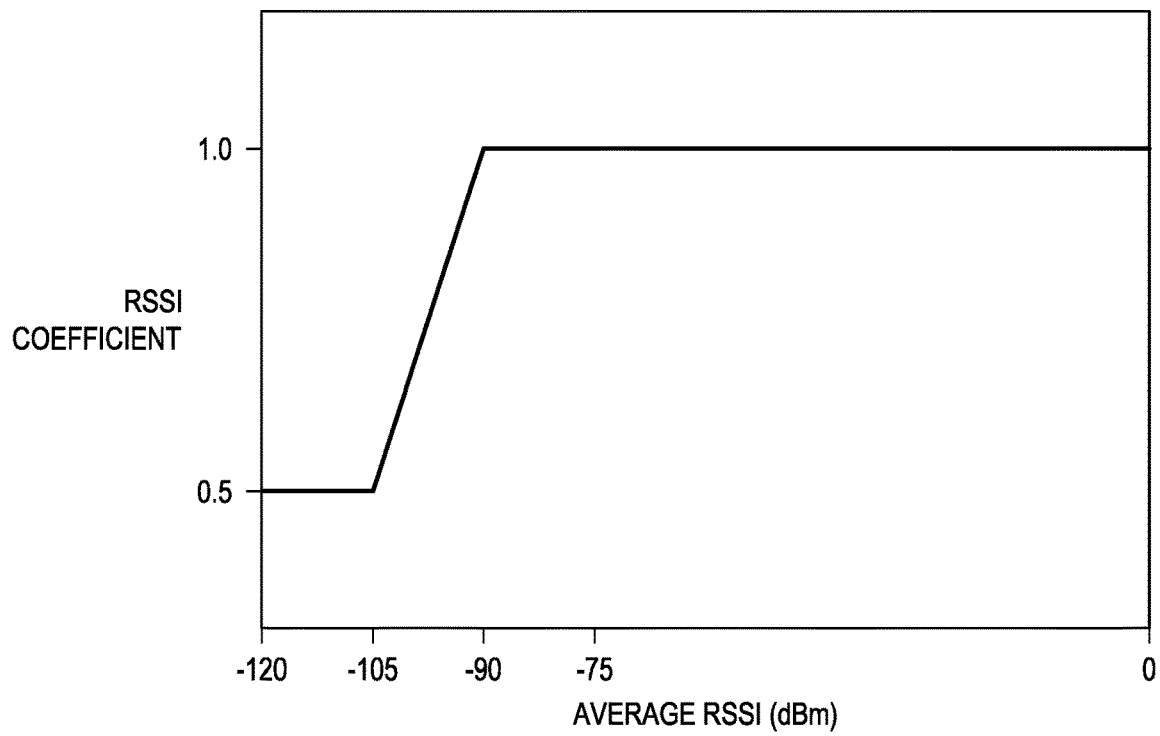
FIG. 4 shows a diagram illustrating assignment of received signal strength indicator coefficient values in accordance with various embodiments.
Figure 5:
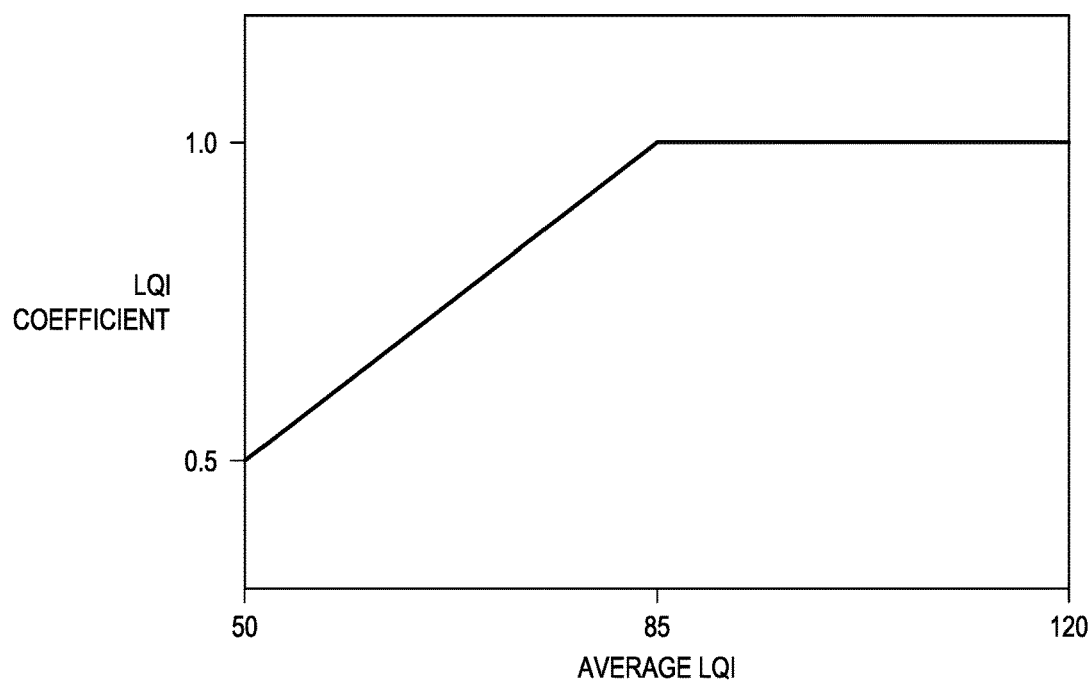
FIG. 5 shows a diagram illustrating assignment of link quality index coefficient values in accordance with various embodiments.

The DMSA logic 210 includes network selection logic 212, confidence rating logic 214 and retransmit logic 216. The confidence rating logic 214 computes and maintains a confidence rating value for the wired network and a confidence rating value for the wireless network. The confidence rating logic 214 may compute the confidence rating value for each network based on historical values of packet deliver ratio (PDR), received signal strength indicator (RSSI), and link quality indicator (LQI) for the network. In some embodiments, the confidence rating logic 214 may calculate a moving average of PDR, RSSI, and/or LQI based on previous data transmissions, and apply the average values to compute confidence rating. The confidence rating logic 214 may update the confidence rating value for a network based on results of each packet transmission via the network. Some embodiments of the confidence rating logic 214 may compute confidence rating as:

$$CR = xyP$$

where:
P is average historical PDR,
x is the RSSI coefficient, and
y is the LQI coefficient.
The confidence rating logic 214 may determine the RSSI coefficient and the LQI coefficient using the two functions respectively shown in FIG. 4 and FIG. 5.

For each packet transferred to the DMSA logic 210 from the internet layer logic 304, the DMSA logic 210 determines, based on the network confidence rating values, which of the wired and wireless networks is to be initially applied to transmit the packet. The network selected for initial transmission may be the network having the higher confidence rating. If confidence ratings of the two networks are equal, the network selection logic 212 may randomly select one of the networks, or apply an additional criterion to select the initial network.

Some embodiments of the network selection logic 212 may apply other metrics to select between the wired network and the wireless network. In some embodiments, load balancing may be implemented by selecting a destination node and/or network that attempts to ensure that the overall traffic served through any of the nodes serving as an intermediate router is similar. In some embodiments, the working life of battery powered nodes (e.g., wireless nodes 104) may be improved by route selection that minimizes the use of battery powered nodes as intermediate routing nodes, by selecting as many wired nodes 106 and combo nodes 102 as possible, where the wired nodes 106 and combo nodes 102 are powered via the power mains.

Figure 6A:
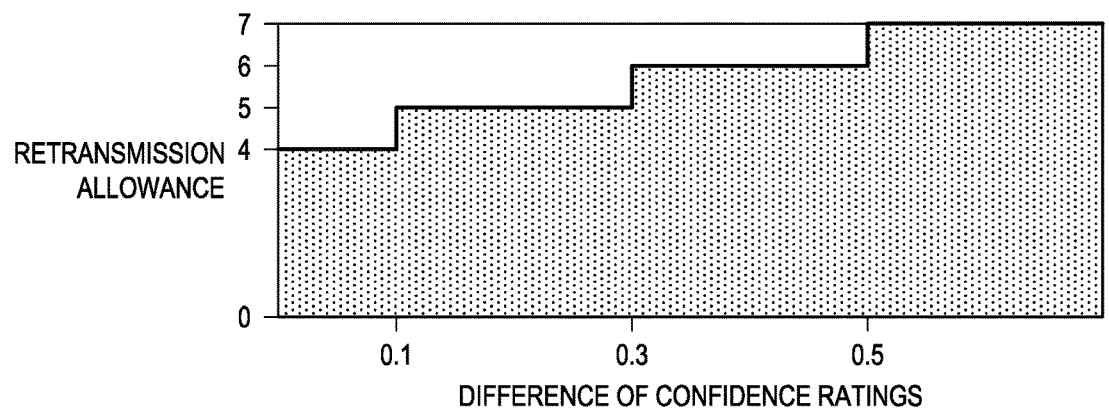
FIGS. 6A and 6B show a diagram illustrating assignment of retransmission allowance values based on difference in confidence rating in accordance with various embodiments.
Figure 6B:
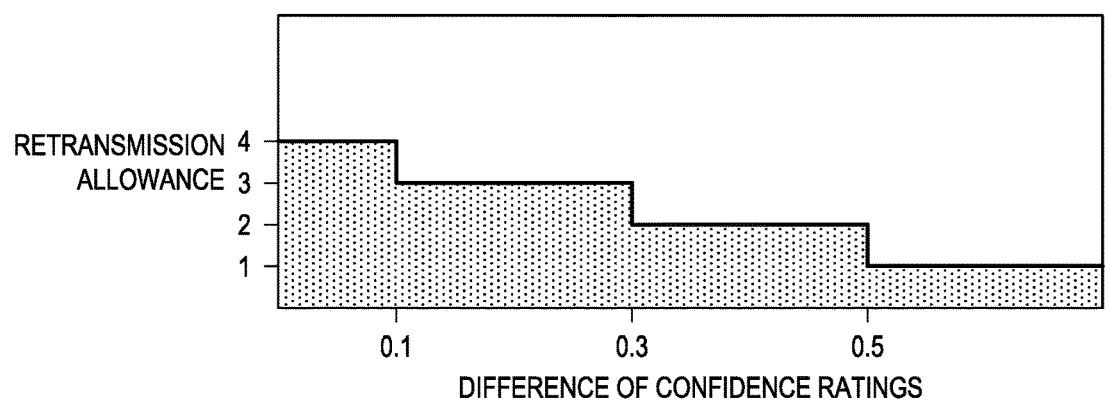

The retransmit logic 216 determines a retransmission allowance for each network. The retransmission allowance specifies the number of retransmission attempts allowed on the associated network. The retransmission allowance for a network may be determined based on the confidence rating of the network. FIGS. 6A and 6B show retransmission allowances for the wired and wireless networks respectively, where the retransmission allowance assigned to each network is based on a difference in confidence ratings computed for the networks. For example, if the network corresponding to FIG. 6A has a confidence rating value of 0.6, and the network corresponding to FIG. 6B has a confidence rating value of 0.2, then the difference of the two confidence rating values is 0.4. Accordingly, the retransmission allowance assigned to the network of corresponding to FIG. 6A is 6, and the retransmission allowance assigned to the network of corresponding to FIG. 6B is 2.

Considering the confidence rating values of 0.6 and 0.2 of the above example, the network selection logic 212 may select the network having the higher confidence rating value (0.6) as the initial network to apply for transmission of the packet. The DMSA logic 210 passes the packet and the retransmission allowance value assigned to the network to the link layer logic (e.g., wired network link layer logic 306). The link layer logic 306 attempts to successfully transmit the packet within the specified number of retransmission attempts.

If transmission of the packet via the initially selected network is unsuccessful, within the specified number of retransmission attempts, then control of packet transmission returns to the DMSA logic 210, and the network selection logic 212 selects the network not initially applied (e.g., the wireless network) for additional transmission attempts. The DMSA logic 210 passes the packet and the retransmission allowance value assigned to the secondary network to the link layer logic (e.g., wireless network link layer logic 308), and transmission of the packet is attempted via the secondary network. If transmission via the secondary network, within the retransmission allowance, is not successful, the control of packet transmission returns to the DMSA logic 210, and the network selection logic 212 may again attempt transmission via the initially selected network. In this manner, the DMSA logic 210 may alternate transmission attempts between the two different networks until transmission is successful or a predetermined maximum number of transmissions has been unsuccessfully attempted. The DMSA logic 210 may drop the packet if transmission is not successful within the maximum number of transmission attempts. With each attempted transmission of a packet, DMSA logic 210 receives network reliability information from the link layer logic, and the confidence rating logic 214 updates the confidence rating for the network on which packet transmission is attempted.

Figure 7:
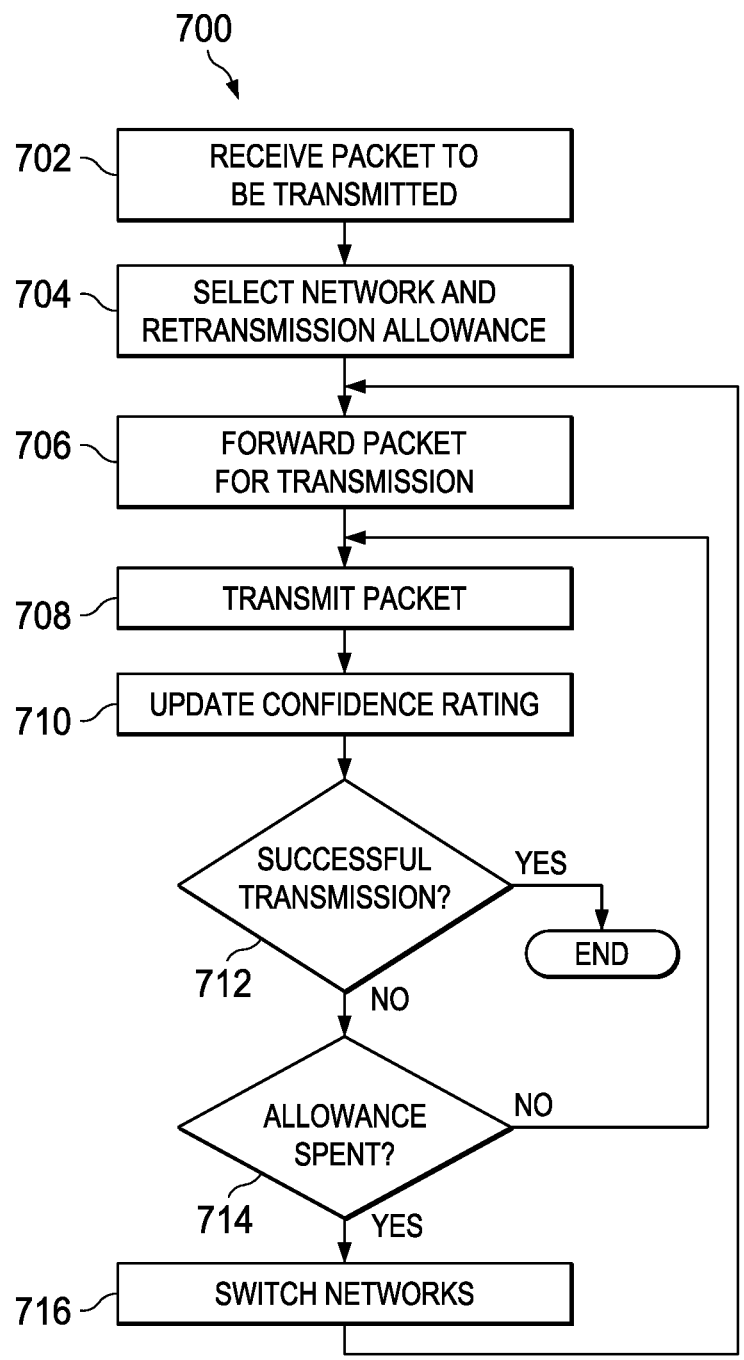
FIG. 7 shows a flow diagram for a method for medium switching in accordance with various embodiments.

FIG. 7 shows a flow diagram 700 for a method for medium switching in a combo node 102 in accordance with various embodiments. Though depicted sequentially as a matter of convenience, at least some of the actions shown can be performed in a different order and/or performed in parallel. Additionally, some embodiments may perform only some of the actions shown. At least some of the operations of the method 700 may be performed by the processor 202 executing instructions retrieved from a non-transitory computer readable storage medium 208.

In block 702, the DMSA logic 210 of combo node 102 receives, from the internet layer logic 304, a packet to be transmitted. In some embodiments, the DMSA logic 210 may receive a packet to be transmitted from higher layer logic other than the internet layer logic 304.

In block 704, the DMSA logic 210 selects a network to apply for initial transmission attempts and assigns a retransmission allowance for use by the selected network. The selection of the network and retransmission allowance may be based on the confidence rating values of each network available to the combo node 102. For example, the network with the higher confidence rating may be selected as the network for initial transmission attempts and be assigned a higher retransmission allowance than the network not selected.

In block 706, the DMSA logic 210 forwards the packet to be transmitted and the assigned retransmission allowance to link layer logic associated with the selected network. The link layer logic forwards the packet to the transceiver of the combo node 102 associated with the selected network, and the packet is transmitted in block 708.

With each transmission attempt, in block 710, the DMSA logic 210 receives network reliability information from the link layer logic, and the DMSA logic 210 updates the confidence rating value for the network.

In block 712, if packet transmission is unsuccessful, and the retransmission allowance has not been spent, in block 714, then the link layer logic retransmits the packet.

In block 712, if packet transmission is unsuccessful, and the retransmission allowance has been spent, in block 714, then control of transmission returns to the DMSA logic 210. In block 716, the DMSA logic 210 switches networks by selecting the network not applied in the last transmission attempt, and forwards the packet and the retransmission allowance for the network to the link layer logic for the network. Switching of networks and attempted transmission may continue in this manner until a maximum number of transmission attempts have been unsuccessfully attempted. Thereafter, the DMSA logic 210 may drop the packet.

Figure 8:
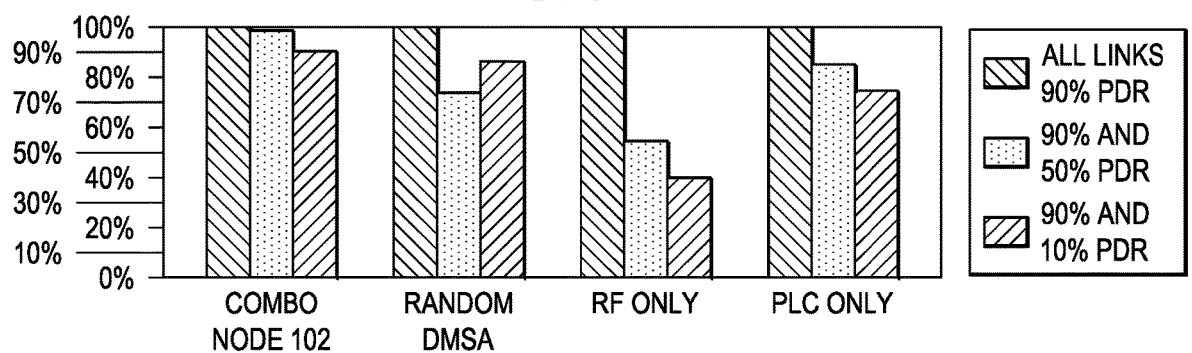
FIG. 8 shows average packet delivery ratios for various Dynamic Medium Switching Algorithm (DMSA) methods.

FIG. 8 shows average packet delivery ratios for various DMSA methods. FIG. 8 shows that using DMSA logic 210 the combo node 102 provides more reliable packet delivery than with other illustrated methods.

Figure 9:
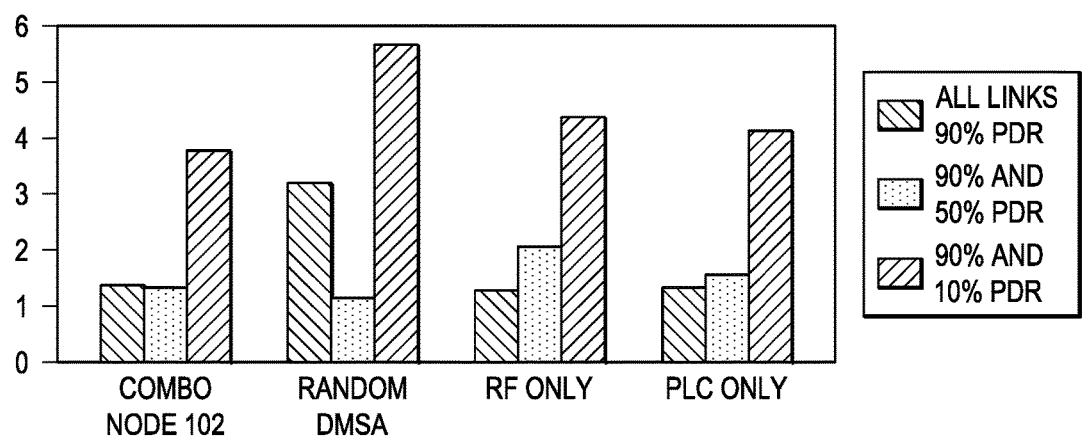
FIG. 9 shows average number of retransmissions required for successful data transfer for various DMSA methods.

FIG. 9 shows average number of retransmissions required for successful data transfer using various DMSA methods. FIG. 9 shows that using DMSA logic 210 the combo node 102 can provide successful packet transfer with fewer retransmissions than other methods.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
a first transceiver coupled to a first network;
a second transceiver coupled to a second network; and
a switch coupled to the first transceiver and the second transceiver, wherein the switch is configured to:
select one of the first transceiver and the second transceiver based on a first value associated with the first network and a second value associated with the second network;
determine a retransmission allowance for the first network based on the first value; and
if transmission of a packet is unsuccessful within the retransmission allowance for the first network, attempt to transmit the packet over the second network within a retransmission allowance for the second network based on the second value.

2. The wireless device of claim 1, wherein:
the first network is a wired network; and
the second network is a wireless network.

3. The wireless device of claim 1, wherein:
the first value is a first confidence rating for the first network; and
the second value is a second confidence rating for the second network.

4. The wireless device of claim 3, wherein:
the switch is configured to select one of the first transceiver and the second transceiver based on which of the first network and the second network has a highest confidence rating indicating a higher likelihood of successful packet transmission.

5. The wireless device of claim 4, wherein:
in response to the first confidence rating equaling the second confidence rating, the switch is configured to randomly select one of the first transceiver and the second transceiver.

6. The wireless device of claim 4, wherein:
in response to the first confidence rating equaling the second confidence rating, the switch is configured to select one of the first transceiver and the second transceiver based on a next criterion.

7. The wireless device of claim 1, further comprising:
alternate attempting transmission of a packet between the first network and the second network until the packet is successfully transmitted or a number of transmission attempts equals a maximum number of transmission attempts.

8. The wireless device of claim 7, wherein:
in response to the maximum number of transmission attempts being reached, the switch is configured to drop the packet.

9. The wireless device of claim 7, wherein:
in response to each alternate attempt at transmission of the packet, the switch is configured to receive reliability information associated with one of the first network and the second network.

10. The wireless device of claim 9, wherein:
the switch is configured to update a confidence rating associated with one of the first network and the second network based on the reliability information received.

11. A method, comprising:
receiving, by a switch, a first value associated with a first network coupled to a first transceiver;
determining, by the switch, a retransmission allowance for the first network based on the first value;
receiving, by the switch, a second value associated with a second network coupled to a second transceiver; and
selecting, by the switch, one of the first transceiver and the second transceiver based on the first value and the second value
if transmission of a packet is unsuccessful within a retransmission allowance for the first network, based on the first value, attempting to transmit the packet over the second network within a retransmission allowance for the second network based on the second value.

12. The method of claim 11, wherein:
the first network is a wired network; and
the second network is a wireless network.

13. The method of claim 11, wherein:
the first value is a first confidence rating for the first network; and
the second value is a second confidence rating for the second network.

14. The method of claim 13, wherein:
the switch is configured to select one of the first transceiver and the second transceiver based on which of the first network and the second network has a highest confidence rating indicating a higher likelihood of successful packet transmission.

15. The method of claim 14, wherein:
in response to the first confidence rating equaling the second confidence rating, the switch is configured to randomly select one of the first transceiver and the second transceiver.

16. The method of claim 14, wherein:
in response to the first confidence rating equaling the second confidence rating, the switch is configured to select one of the first transceiver and the second transceiver based on a next criterion.

17. The method of claim 11, further comprising:
alternating, by the switch, between selection of the first network and the second network for attempted transmission of a packet between until the packet is successfully transmitted or a number of transmission attempts equals a maximum number of transmission attempts.

18. The method of claim 17, wherein:
in response to the maximum number of transmission attempts being reached, the switch is configured to drop the packet.

19. The method of claim 17, wherein:
in response to each alternate attempt at transmission of the packet, the switch is configured to receive reliability information associated with one of the first network and the second network.

20. The method of claim 19, wherein:
the switch is configured to update a confidence rating associated with one of the first network and the second network based on the reliability information received.

* * * * *